(12) United States Patent
Worland

(10) Patent No.: US 9,933,864 B1
(45) Date of Patent: Apr. 3, 2018

(54) STEADY CONTENT DISPLAY

(71) Applicant: AMAZON TECHNOLOGIES, INC., Reno, NV (US)

(72) Inventor: Christopher Philip Worland, Redmond, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 290 days.

(21) Appl. No.: 14/014,158

(22) Filed: Aug. 29, 2013

(51) Int. Cl.
*G06F 3/0346* (2013.01)
*G06F 3/147* (2006.01)
*G09G 5/00* (2006.01)

(52) U.S. Cl.
CPC ............ *G06F 3/0346* (2013.01); *G06F 3/147* (2013.01); *G09G 5/003* (2013.01)

(58) Field of Classification Search
CPC .......... G06F 3/013; G06F 1/163; G06F 21/32; G06F 15/0291; G06F 17/21; G06F 3/0483; G06F 3/0485; G06F 2221/2111; G06F 3/0338; G06F 3/0346; G09G 2380/14; H04N 21/4126; H04N 21/42222; H04N 21/440263; H04N 21/4728; A63B 2071/0658; A63B 71/0622; H04L 63/0861; H04L 67/22; A63F 2300/105; A63F 2300/1087

USPC ....... 345/123, 156, 158, 162, 166, 672, 684, 345/688
See application file for complete search history.

(56) References Cited

U.S. PATENT DOCUMENTS

| | | | |
|---|---|---|---|
| 7,616,187 B2 | 11/2009 | Koo et al. | |
| 8,654,074 B1 * | 2/2014 | Auguste et al. | 345/156 |
| 8,681,093 B2 | 3/2014 | Lee et al. | |
| 9,035,878 B1 | 5/2015 | Wheeler | |
| 2006/0103624 A1 * | 5/2006 | Ishito et al. | 345/156 |
| 2009/0002391 A1 * | 1/2009 | Williamson et al. | 345/619 |
| 2011/0241982 A1 | 10/2011 | Yang et al. | |
| 2012/0139952 A1 * | 6/2012 | Imai et al. | 345/672 |
| 2012/0194415 A1 * | 8/2012 | De Mers | G06F 3/0484 345/156 |
| 2012/0212508 A1 * | 8/2012 | Kimball | 345/633 |
| 2012/0320500 A1 * | 12/2012 | Lee | G06F 3/147 361/679.01 |
| 2013/0335201 A1 * | 12/2013 | Kang | G06K 7/10366 340/10.5 |
| 2014/0012774 A1 * | 1/2014 | Blom | 705/347 |

* cited by examiner

*Primary Examiner* — Amare Mengistu
*Assistant Examiner* — Gloryvid Figueroa-Gibson
(74) *Attorney, Agent, or Firm* — Lindauer Law, PLLC

(57) ABSTRACT

Described herein are systems, devices and methods for causing content to appear stable in space such that a user may continue to consume the content while there is relative motion between the user's head and a media device presenting content. The media device may present content based on generated predictive data which may represent predicted positions of the media device relative to a stabilization point.

20 Claims, 11 Drawing Sheets

STEADY CONTENT DISPLAY

BACKGROUND

Users may consume content presented by media devices such as tablets and smartphones while riding in a vehicle such as a bus, a car or a train. However, reading the content may become difficult when a media device moves rapidly because, for example, the vehicle bounces up and down which may cause the phone to bounce up and down.

Figure 1:
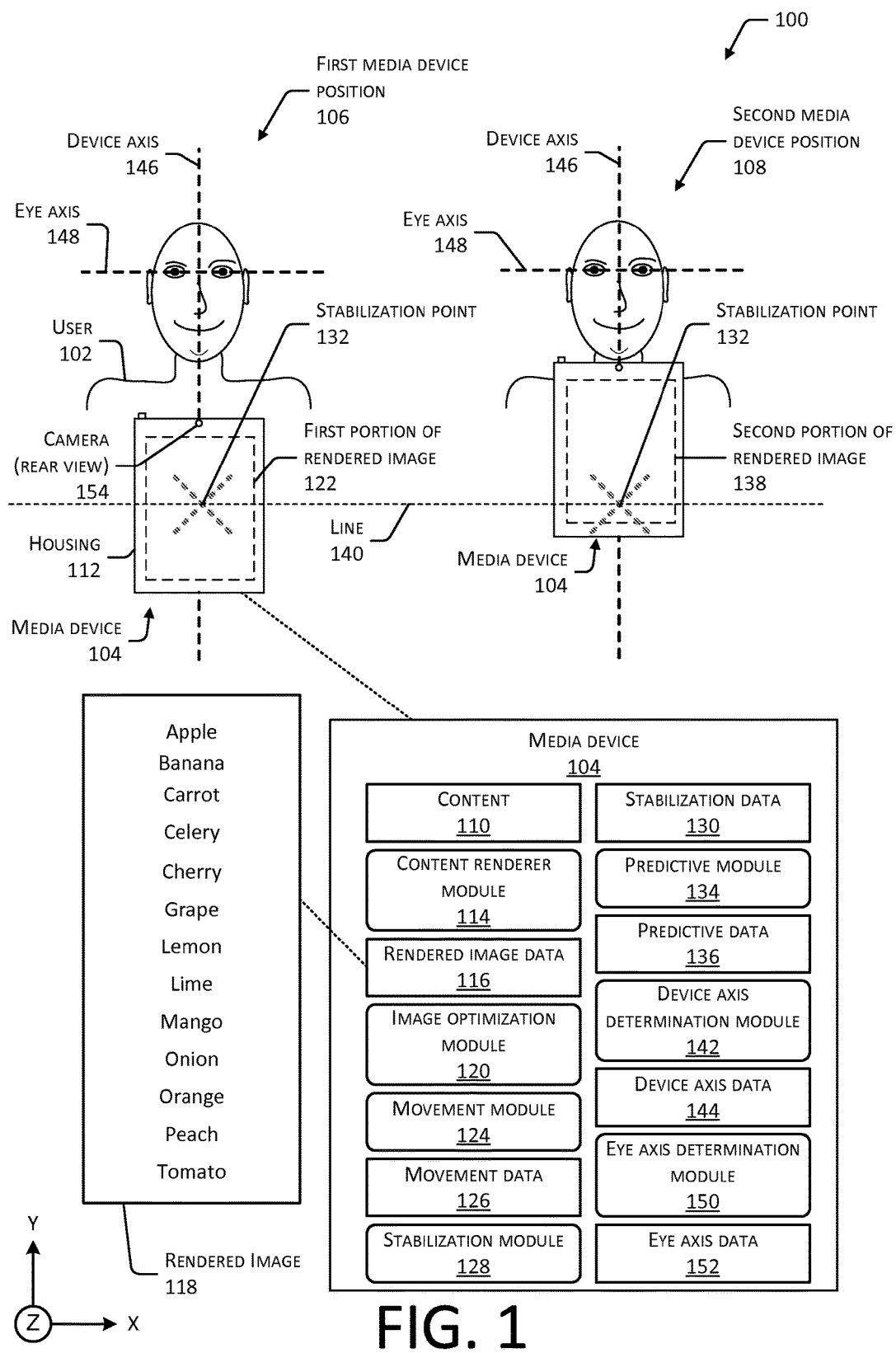
FIG. 1 is a block diagram of a system for displaying portions of a rendered image based on predictive data.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Users may consume content presented by media devices such as tablets and smartphones while walking, riding in a vehicle such as a bus, a car or a train, and so forth. While the user is consuming content displayed by the media device, the media device or the user of the media device may move such that the user's consumption of the displayed content becomes difficult or impossible. For example, the user may be using the media device to read a digital book while riding on a bus. The bus may move along a path which includes numerous potholes which cause the media device or the user of the media device to move relative to one another such that continued consumption becomes difficult or impossible.

This disclosure relates to systems and methods for enabling one or more users to continue to consume content during movement of at least one of a media device or a user of the media device. The media device may present content based on data associated with a spatial relationship between the media device and the user of the media device.

The media device may comprise a mobile digital device, a tablet computer, a laptop computer, a wearable computer, and so forth. The media device may include a display device having a display window. The display window may comprise a section of the display device which is configured to make content visible to the user of the display device. The display window may have various shapes, such as a rectangular shape or a square shape. The display window may have a length and a width. The content may include audio data, video data, electronic book data, application data, game data, and so forth.

In some implementations, the media device generates a rendered image which may be consumed by the user. The rendered image may comprise a digital image which is generated from the content. The rendered image may comprise text data. For example, the rendered image may comprise a particular page of a digital book.

The rendered image may have an area that is larger than the area of the display window. The area of the rendered image may be larger than the area of the display window to enable the user to consume the content. For example, the rendered image may include thirty lines of text and have a virtual length of eleven inches and a virtual width of eight inches. The display window may have a physical length of three inches and a physical width of two inches. In this example, if the rendered image which includes thirty lines of text had a virtual size that is the same size as the display window, consumption of the rendered image would be difficult or impossible. In some implementations, the rendered image has an area that is smaller than the area of the display window.

In some implementations, the virtual length of the rendered image is larger than the physical length of the display window, and the virtual width of the rendered image is the same as the physical width of the display window. In other implementations, the virtual width of the rendered image is larger than the physical width of the display window, and the virtual length of the rendered image is the same as the physical length of the display window.

The media device may display different portions of the rendered image at the display window at different times which are used to enable the user to consume content during movement. In one example, the media device displays a first portion of the rendered image at the display window. While the media device displays the first portion of the rendered image, the media device may enable the user to consume the displayed first portion of the rendered image. For example, the rendered image may comprise page fifty of a one hundred page digital book. Page fifty may include a total of thirty lines of text. In this example, the first portion of the rendered image may comprise ten lines of the thirty lines of text. A particular portion of the rendered image may be described as being located above another portion of the rendered image, below the other portion of the rendered image, to the left of the other portion of the rendered image, or to the right of the other portion of the rendered image. In some implementations, the portion of the rendered image may include the entire rendered image.

The media device may generate predictive data which may be used to generate and display the portions of the rendered image such that the user may consume content during movement. The predictive data may represent one or more positions of the media device, or a component thereof (e.g., the display window) relative to a stabilization point. The media device may generate the stabilization point which may comprise a reference point in space relative to Earth or some other reference or object which is considered fixed.

The media device may generate the predictive data based on movement data. The movement data may comprise at least one of device movement data representing movement of the media device, or user movement data representing moment of a user of the media device. The media device may include one or more sensors configured to generate the movement data based on the movement of at least one of the media device or the user of the media device. The one or more sensors may include at least one of an accelerometer, a gyroscope, a proximity sensor, and so forth.

The movement data may include a movement value associated with the movement of at least one of the media device or the user of the media device. The movement value may represent the distance in which the media device has moved relative to a point in space. For example, the movement value may indicate that the media device has moved upward at a distance of two inches from a point in space. The movement value may represent the distance in which the user of the media device has moved relative to the media device. For example, the movement value may indicate that the user has moved downward relative to the media device at a distance of one inch.

In some implementations, in response to the movement value being greater than or equal to a threshold value, the media device generates the stabilization point. For example, the movement value may be measured in gravitational force ("g-force"). The one or more sensors may be configured to generate the stabilization point in response to the g-force of the movement vale being equal to or greater than a predetermined amount.

In some implementations, the media device generates the predictive data based on the position of the media device relative to a feature associated with the user of the media device. The feature may comprise at least one of eyes of the user, a nose of the user, a mouth of the user, ears of the user, a hat worn by the user, or jewelry worn by the user. In one example, the media device is configured to display a portion of a rendered image such that the relative position of the stabilization point and the feature associated with the user remains about the same. During at least one of device movement or user movement, the relative position of the stabilization point and the feature associated with the user remains about the same such that the user may continue to consume the content.

The media device may generate the predictive data by comparing feature data acquired at two or more times. The feature data may represent at least one of the eyes of the user, the nose of the user, the mouth of the user, the ears of the user, the hat worn by the user, or jewelry worn by the user. In one example, at a first point in time, the media device may acquire first feature data representing the user's eyes using a camera of the media device. At a second point in time, the media device may acquire second feature data representing the user's eyes using the camera. The media device may compare the first feature data and the second feature data and determine that the positions of the user's eyes have changed by a certain amount. For example, the user's eyes may bounce up and down while the user is running on a treadmill. Based on the determination that the user's eye position has changed, the media device may generate the predictive data. In this implementation, the predictive data may represent one or more portions of the rendered image. When the media device displays the one or more portions of the rendered image, the media device may enable the user to continue to consume the content during the user movement.

The media device may have a device axis comprising an axis of the media device. In one example, the device axis is parallel to the longest dimension of the media device. The media device may include other devices to determine the device axis. For example, an accelerometer, a gyroscope, or a combination thereof may be used to determine the device axis of the media device.

By displaying the content such that the position of the content relative to the user's eyes remains the same or about the same, the media device may enable a user to continue to consume content during relative displacement between the media device and the user. Relative displacement between the media device and the user may cause the consumption of content to be difficult or impossible.

Illustrative System

FIG. 1 is a block diagram of a system 100 for displaying portions of a rendered image based on predictive data. In FIG. 1, a user 102 is depicted using a media device 104 with a first media device position 106, and a second media device position 108. The media device 104 depicted in FIG. 1 is oriented such that the rear view of the media device 104 is shown.

The media device 104 is configured to present, store, manipulate, or otherwise participate in the consumption of content 110. The media device 104 may include a variety of devices, such as a mobile digital device, a smartphone, a tablet computer, a desktop computer, a laptop computer, a television, an electronic book ("eBook") reader, a gaming console, a set-top box, a media player, an in-vehicle communication system, a wearable computing device and so forth. The content 110 may include audio data, video data, electronic book data, application data, game data, and so forth. The content 110 may be downloaded or streamed from a content provider to the media device 104.

The media device 104 may include a housing 112 which may be configured to support certain components of the media device 104. Although the shape of the housing 112 depicted in FIG. 1 has a rectangular shape, the housing 112 may have other shapes, such as a square shape, a circular shape, and irregular shape, and so forth. The media device 104 is discussed in more detail below with regard to FIG. 9.

The media device 104 may include a content renderer module 114 configured to generate rendered image data 116 using the content 110. The rendered image data 116 may comprise a bitmap of a rendered image 118. The rendered image 118 may represent a particular image of the content 110 which the user 102 may consume. For example, the rendered image 118 may represent a page in a book, a webpage, a photo, and so forth. In another example, when the user 102 is viewing a movie, the rendered image 118 may represent a particular frame of the movie.

The media device 104 may include an image optimization module 120 that is configured to present a portion of the rendered image 118 using an output device of the media device 104. The presentation may include displaying the rendered image 118 using a display device of the media device 104. The portion of rendered image 118 may comprise the entire rendered image 118.

At the first media device position 106, the image optimization module 120 presents a first portion of the rendered image 122. The image optimization module 120 may generate the first portion of the rendered image 122 based on a user 102 selection. For example, the user 102 may operate the media device 104 and select content 110 to view, which causes the media device 104 to display the top portion of a rendered image 118.

When the content 110 is displayed by the media device 104, the content 110 is presented right-side up relative to the user 102. For example, where the content 110 includes text, the presentation of the text is presented to the user 102 such that the user 102 may read the text in its proper orientation relative to the user 102.

The media device 104 may include a movement module 124 which may be configured to generate movement data 126. The movement data 126 may comprise device movement data representing movement of the media device 104, user movement data representing movement of the user 102 of the media device 104, or a combination thereof. In other words, the movement data 126 may comprise data representing a relative displacement between the media device 104 and the user 102. The relative displacement may be caused by numerous events. For example, the user 102 of the media device 104 may be viewing the content 110 displayed by the media device 104 while riding in a bus. The bus may move and may cause the media device 104, the user 102, or a combination of both to move in various directions based on, for example, the bus hitting a bump in the road. In another example, the user 102 may be using exercise equipment (e.g., running on a treadmill) which causes the user 102 to move relative to the media device 104. The movement module 124 may generate the movement data 126 using one or more sensors. The sensors may include movement sensors such as an accelerometer, a gyroscope, or proximity sensors such as an optical proximity sensor, capacitive proximity sensor, or a combination thereof. In some implementations, the movement data 126 may be from sensors external to the media device 104. For example, the movement data 126 may be provided by one or more sensors in a vehicle in which the user 102 is riding.

In response to the generation of the movement data 126, a stabilization module 128 may generate stabilization data 130. The stabilization data 130 may represent a stabilization point 132. The stabilization point 132 may represent a reference relative to Earth or some other reference or object which is considered fixed.

Once the stabilization data 130 is generated, a predictive module 134 may generate predictive data 136 using the movement data 126 and the stabilization data 130. The predictive data 136 may represent one or more positions of the media device 104 relative to the stabilization point 132.

Using the predictive data 136, the image optimization module 120 may generate a second portion of the rendered image 138. The second portion of the rendered image 138 may be located above the first portion of the rendered image 122, below the first portion of the rendered image 122, to the left of the first portion of the rendered image 122, or to the right of the first portion of the rendered image 122.

As shown in FIG. 1, the stabilization point 132 remains the same relative to Earth or some other fixed object. Line 140 may be described as a straight line which extends through each of the stabilization points 132 to show that the stabilization point 132 remains the same relative to Earth.

The image optimization module 120 may present the generated second portion of the rendered image 138 such that during the occurrence of movement of the media device 104, the user 102 of the media device 104 may continue to consume the content 110. The image optimization module 120 may be configured to scroll from the first portion of the rendered image 122 to the second portion of the rendered image 138. Scrolling from the first portion of the rendered image 122 to the second portion of the rendered image 138 may be described as sliding text, images or video across a display, vertically, horizontally, or a combination of both. Scrolling may be described as moving the user's 102 view across what is apparently a larger image that is not wholly seen by the user 102. The scrolling may be implemented by manipulating an input device of the media device 104.

The predictive module 134 may generate the predictive data 136 based on the user's 102 movement relative to the media device 104. In one implementation, the media device 104 generates predictive data 136 based on the movement of a feature associated with the user 102 of the media device 104 relative to the media device 104. The feature may comprise at least one of eyes of the user 102, a nose of the user 102, a mouth of the user 102, ears of the user 102, a hat worn by the user 102, or jewelry worn by the user 102.

The image optimization module 120 may generate and display portions of the rendered image 118 such that the relative position of the stabilization point 132 and the feature associated with the user 102 remains about the same. During at least one of media device 104 movement or user 102 movement, the relative position of the stabilization point 132 and the feature associated with the user 102 remains about the same such that the user 102 may continue to consume the content 110.

In some implementations, the media device 104 may include a device axis determination module 142 configured to generate device axis data 144 representative of a device axis 146 of the media device 104. The device axis 146 may indicate the position of the media device 104. The position of the device axis 146 may be expressed relative to a spatial orientation of the media device 104. The spatial orientation is relative to a frame of reference defined by the Earth, and is described in more detail below with regard to FIG. 2. The device axis 146 may be described as a line which is parallel to the longest dimension of the media device 104.

The device axis data 144 may be generated using one or more of an accelerometer(s), a gyroscope(s), a gravimeter(s), a tilt sensor, and so forth. The accelerometer, gyroscopes, and so forth may be used to determine the orientation of the device axis 146 of the media device 104 relative to spatial orientation.

In some implementations, the feature may comprise an eye axis 148 of the user 102. For example, the media device 104 may include an eye axis determination module 150 configured to generate eye axis data 152 which represents an eye axis 148 of the user 102. The eye axis 148 may be described as a straight line which extends through each of the user's 102 eyes.

To generate the eye axis data 152, the eye axis determination module 150 may use a camera 154 that acquires feature data. The feature data may include data representative of the user's 102 eyes, mouth, ears, nose, shoulders of the user 102, a hat worn by the user 102, facial hair of the user 102, jewelry worn by the user 102, or glasses worn by the user 102, and so forth.

In FIG. 1, the feature data includes data indicative of a first eye of the user 102, and data indicative of a second eye of the user 102. The determination of the eye axis data 152 may be based on the first eye data and the second eye data. In some implementations, the determination of the eye axis data 152 may be based on other features of the user 102, for example, the user's 102 mouth, ears, nose, shoulders of the user 102, a hat worn by the user 102, facial hair of the user 102, jewelry worn by the user 102, or glasses worn by the user 102, and so forth.

By displaying the content 110 such that the relative position of the stabilization point 132 and the user's 102 eyes remains the same or about the same, the media device 104 may enable a user 102 to continue to consume content 110. Relative displacement of the media device 104 and the user 102 may cause the consumption of content 110 to be difficult or impossible.

While the modules and data are described above with regard to the media device 104, it is understood that in some implementations one or more of the modules or data may be distributed to another computing device. For example, in some implementations the predictive module 134 may execute on a proxy server or other computing device in communication with the media device 104.

Figure 2:
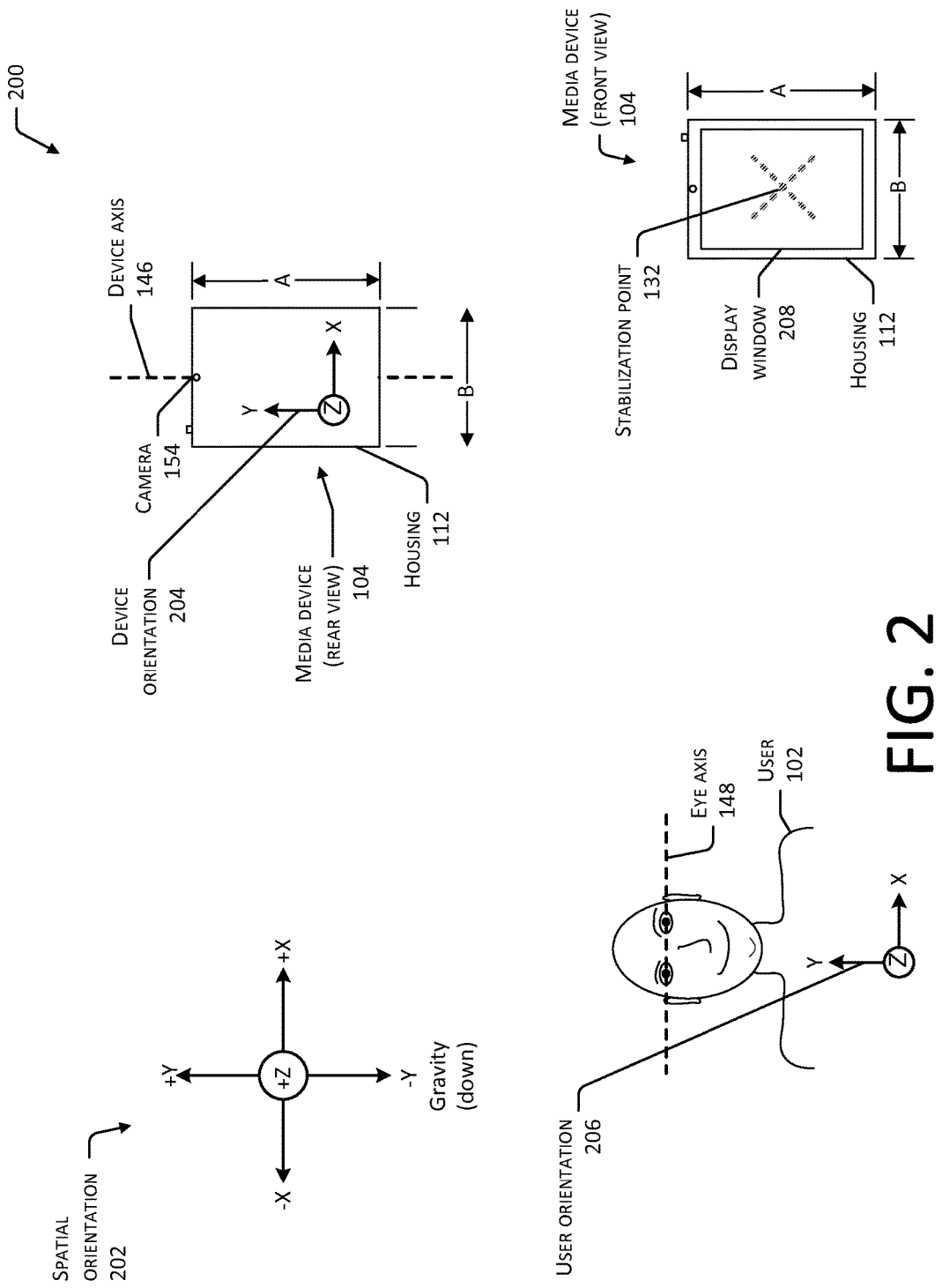
FIG. 2 is a schematic of orientations and references described herein.

FIG. 2 is a schematic 200 of orientations and references described herein. The orientations include a spatial orientation 202, a device orientation 204, and a user orientation 206.

The spatial orientation 202 illustrates an example frame of reference relative to the Earth or another reference frame which is considered fixed and which may be used to determine positions and orientations of the user 102, the media device 104, and the stabilization point 132. As illustrated, the spatial orientation 202 includes an X axis, a Y axis and a Z axis. As shown in FIG. 2, the Y axis is oriented based on gravity. The X axis and the Z axis may be described as being perpendicular to gravity, and perpendicular to one another. The spatial orientation 202 may be described as an Earth-based coordinate system, such as north-based azimuth, where the Y axis is oriented vertically based on terrestrial gravity.

The media device 104 depicted with the device orientation 204 is oriented such that a rear view of the media device 104 is shown. The media device 104 depicted includes the following three dimensions: dimension A which extends along a longest edge of the media device 104 (such as height); dimension B which extends along a second longest edge of the media device 104 (such as width); and dimension C (not shown) which extends along a shortest edge of the media device 104 (such as thickness). The device orientation 204 includes an X axis, a Y axis and a Z axis. In this example, the Y axis is parallel with dimension A of the media device 104. The X axis is parallel with dimension B of the media device 104. The Z axis is perpendicular to the X and the Y axes, and is parallel with dimension C of the media device 104. The device axis 146 may be described as being parallel with the Y axis of the device orientation 204. The predictive module 134 may be configured to generate the predictive data 136 based on the device orientation 204. The device orientation 204 may be determined using one or more sensors. For example, the device orientation 204 may be determined using one or more of an accelerometer, a gyroscope, a gravimeter, a tilt sensor, and so forth. In some implementations, the device orientation 204 may be determined based on a system which generates an active signal, providing a fixed coordinate system. For example, a light system which generates infrared beams may be used to determine the device orientation 204.

While the media device 104 illustrated in the figures depict the media device 104 as having a rectangular shape, the media device may have any shape, such as a square shape, round shape, triangular shape, or irregular polyhedron. For example, as shown in FIG. 2, the dimension A and the dimension B may be the same length.

The user orientation 206 includes an X axis, a Y axis and a Z axis. The predictive module 134 may be configured to generate the predictive data 136 based on the user orienta-tion 206. In this example, the eye axis 148 is parallel with the X axis of the user orientation 206.

The media device 104 depicted with the stabilization point 132 is oriented such that the front view of the media device 104 is shown. The media device 104 includes display window 208. The display window 208 may be described as the portion of the media device 104 which enables the user 102 to view displayed content 110.

Figure 3:
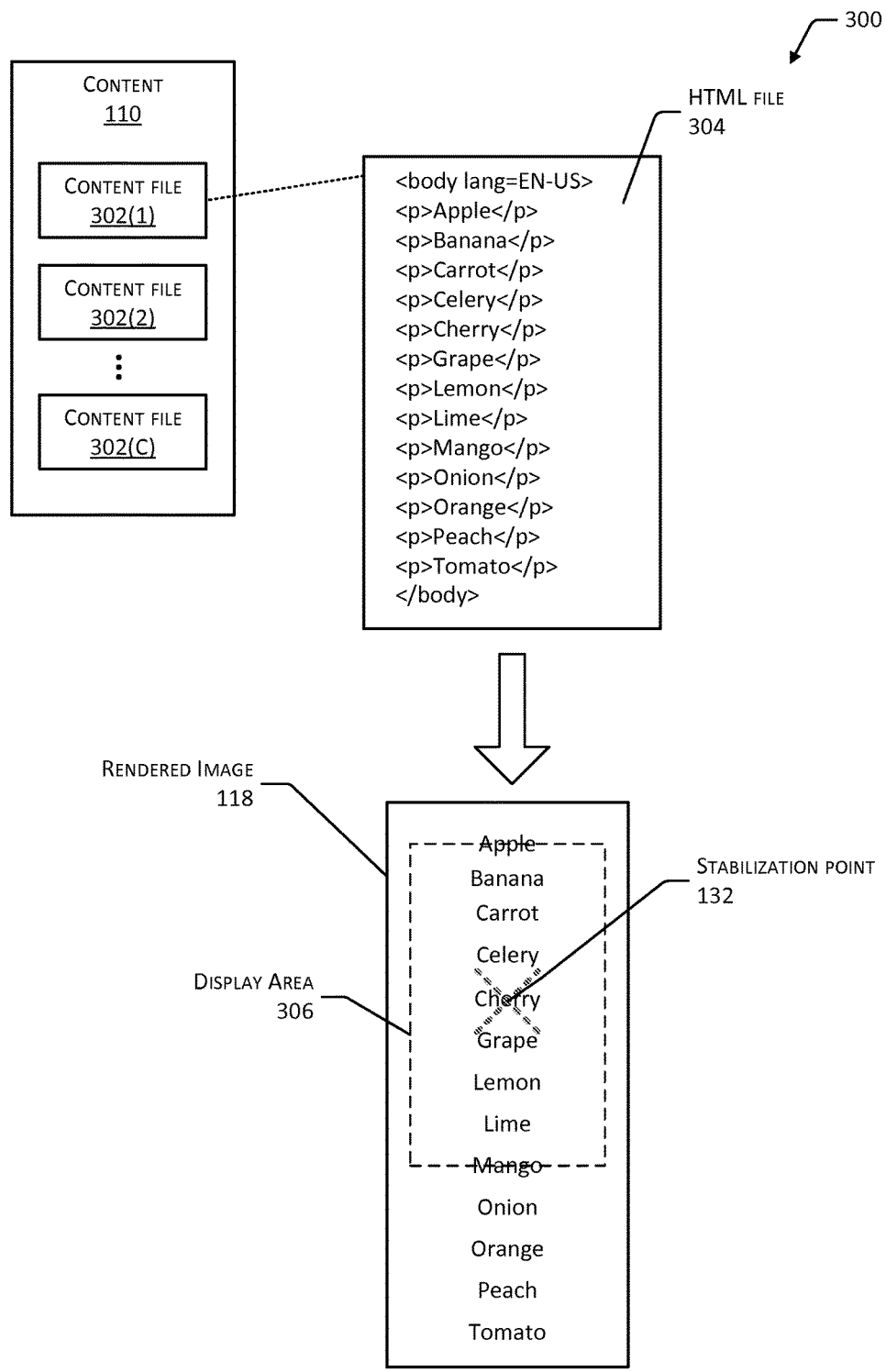
FIG. 3 is a schematic of a rendered image which is generated from content.

FIG. 3 is a schematic of a rendered image 118 which is generated from the content 110. In FIG. 3, the content 110 includes one or more content files 302(1), 302(2), . . . 302(C). The content file 302 may include audio data, video data, electronic book data, application data, game data, and so forth. As illustrated in FIG. 3, the content file 302(1) may include HTML file 304.

In FIG. 3, the rendered image 118 is generated from the HTML file 304. In FIG. 3, the rendered image 118 includes a list of fruits and vegetables which includes the following: "Apple, Banana, Carrot, Celery, Cherry, Grape, Lemon, Lime, Mango, Onion, Orange, Peach, and Tomato."

Display area 306 may be described as a dotted rectangular line which shows an example portion of the rendered image 118 which may be presented by the media device 104. In one example, the media device 104 may display the area illustrated within the display area 306 at the display window 208. More specifically, when the media device 104 presents the portion of the rendered image 118 which is within the display area 306, the media device 104 would present the "Banana, Carrot, Celery, Cherry, Grape, Lemon, and Lime". In this example, because the "Onion, Orange, Peach, and Tomato" and portions of "Apple" and "Mango" are outside the display area 306, they are not displayed.

The stabilization point 132 is associated with a position of the rendered image 118. In FIG. 3, the position of the rendered image 118 that is associated with the stabilization point 132 is shown as "Cherry". The media device 104 may use the stabilization point 132 illustrated in FIG. 3 to fix the rendered image 118 to a position in space.

Figure 4:
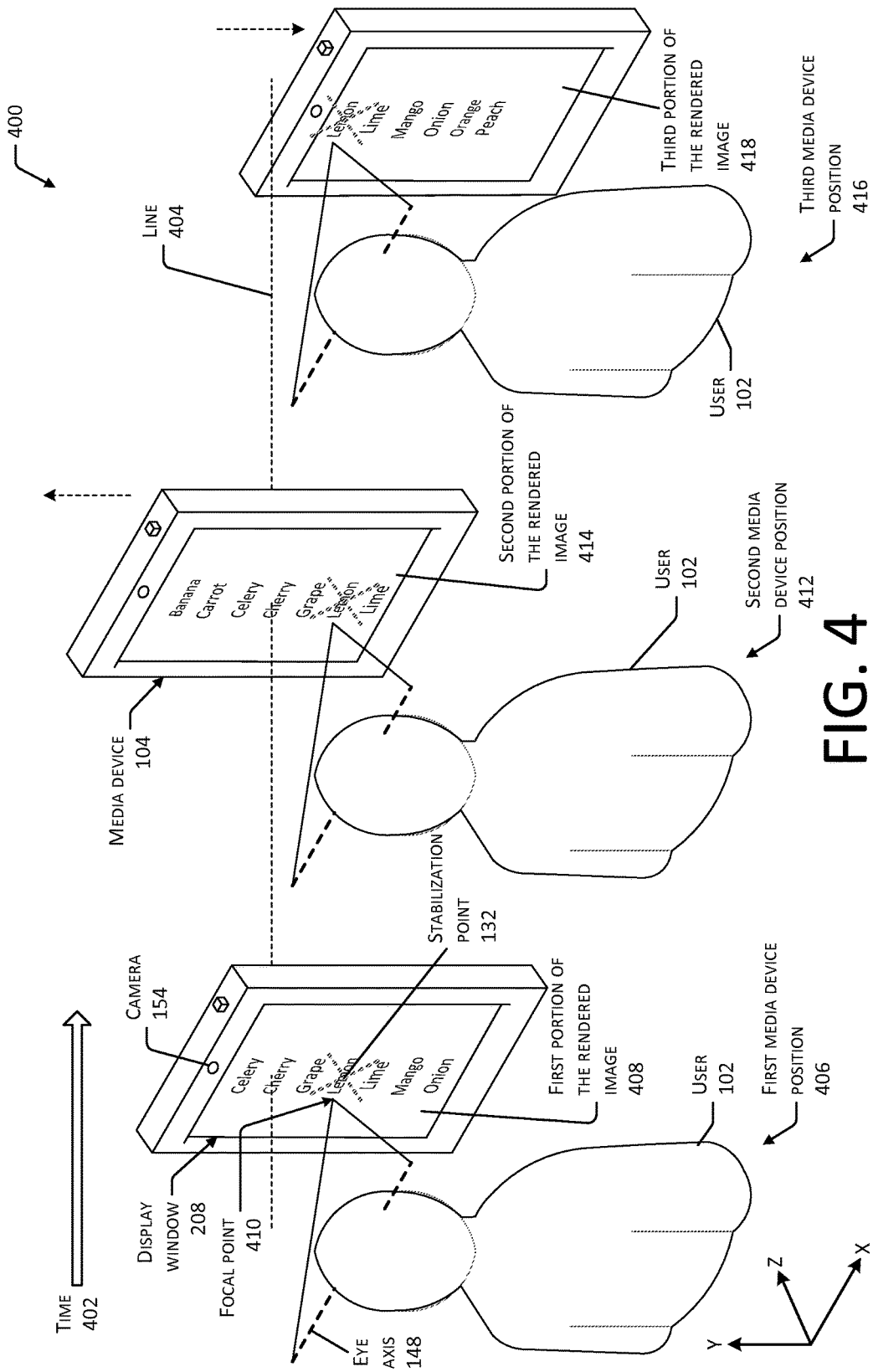
FIG. 4 is a schematic of the media device, illustrating different portions of the rendered image being displayed based on changing media device positions.

FIG. 4 is a schematic 400 of the media device 104, illustrating different portions of the rendered image 118 being displayed based on changing media device 104 positions. In this illustration, time increases across the page, as indicated by the arrow 402. Line 404 is an arbitrary line depicted to illustrate the displacement of the media device 104 over time. The user 102 depicted in FIG. 4 remains fixed.

In a first media device position 406, the media device 104 generates and displays the first portion of the rendered image 408 at the display window 208 of the media device 104. The first portion of the rendered image 408 may be displayed based on the user 102 operating the media device 104 and selecting the first portion of the rendered image 408 to be displayed. In the first media device position 406, the user 102 is reading a portion of a list of fruits and vegetables. The first portion of the list of fruits and vegetables includes the following: "Celery, Cherry, Grape, Lemon, Lime, Mango, and Onion." A focal point 410 illustrates that the user 102 is focused at a particular point of the list, just before the word "Lemon".

In the second media device position 412, the media device 104 moves upward relative to the media device 104 depicted in the first media device position 406. The stabilization point 132 may be generated based on the movement of the media device 104. The media device 104 generates and displays the second portion of the rendered image 414 at the display window 208 of the media device 104. The second portion of the rendered image 414 may be generated based on the predictive data 136 which may be generated using the stabilization point 132 and the movement data 126 generated from the media device 104 movement. The second portion of the rendered image 414 is a list of fruits and vegetables which includes the following: "Banana, Carrot, Celery, Cherry, Grape, Lemon, and Lime." The focal point 410 illustrates that the user 102 is still focused at the particular point of the list, just before the word "Lemon".

In the third media device position 416, the media device 104 moves downward relative to the media device 104 depicted in the second media device position 412. The media device 104 generates and displays the third portion of the rendered image 418 at the display window 208 of the media device 104. The third portion of the rendered image 418 may be generated based on the predictive data 136. The third portion of the rendered image 418 is a list of fruits and vegetables which includes the following: "Lemon, Lime, Mango, Onion, Orange, and Peach." The focal point 410 illustrates that the user 102 is still focused at the particular point of the list, just before the word "Lemon".

By displaying the different portions of the rendered image 408, 414 and 418 as the device moves up and down, the media device 104 may enable the user 102 to continue to consume the content 110 while the media device 104 moves upward and downward relative to the user 102.

Figure 5:
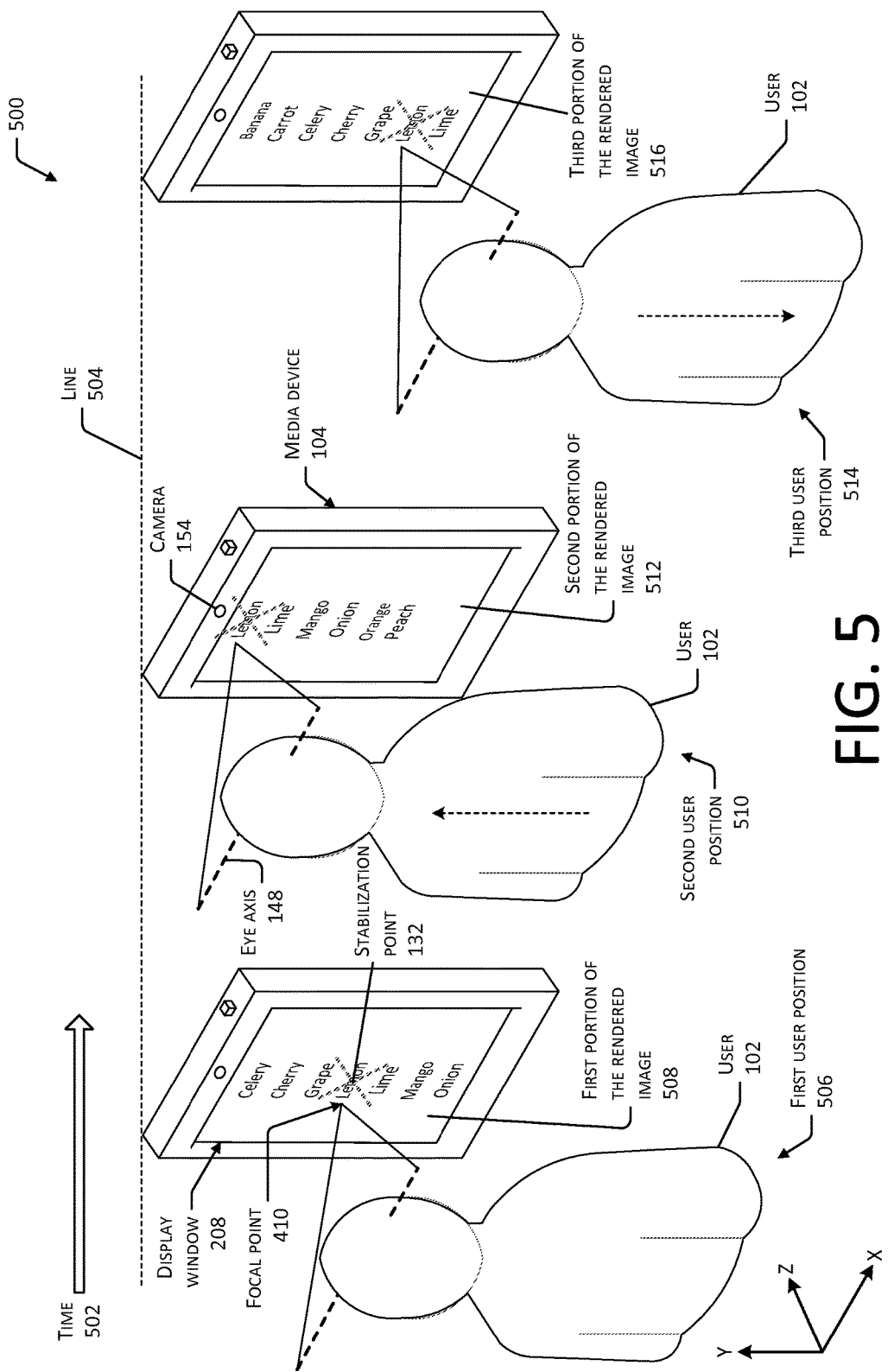
FIG. 5 is a schematic of the media device, illustrating different portions of the rendered image being displayed based on the user moving upward and downward relative to the media device.

FIG. 5 is a schematic 500 of the media device 104, illustrating different portions of the rendered image 118 being displayed based on the user 102 moving upward and downward relative to the media device 104. For example, the user 102 depicted in FIG. 5 may be visualized as running on a treadmill. In this illustration, time increases across the page, as indicated by the arrow 502. Line 504 is an arbitrary line depicted to illustrate that the media device 104 remains fixed.

In a first user position 506, the media device 104 generates and displays a first portion of the rendered image 508 at the display window 208 of the media device 104. The first portion of the rendered image 508 may be displayed based on the user 102 operating the media device 104 and selecting the first portion of the rendered image 508 to be displayed. In the first user position 506, the user 102 is reading a portion of the list of fruits and vegetables. The first portion of the rendered image 508 is a list of fruits and vegetables which includes the following: "Celery, Cherry, Grape, Lemon, Lime, Mango, and Onion." The focal point 410 illustrates that the user 102 is focused at a particular point of the list, just before the word "Lemon".

In a second user position 510, the user 102 moves upward relative to the user 102 depicted in the first user position 506. The stabilization point 132 may be generated based on the movement of the user 102. The media device 104 generates and displays a second portion of the rendered image 512 at the display window 208 of the media device 104. The second portion of the rendered image 512 may be generated based on the predictive data 136. The predictive data 136 may be generated using the stabilization point 132 and the movement data 126 which is generated from the user 102 movement. The second portion of the rendered image 512 is a list of fruits and vegetables which includes the following: "Lemon, Lime, Mango, Onion, Orange, and Peach." The focal point 410 illustrates that the user 102 is still focused at the particular point of the list, just before the word "Lemon". In this example, during the user 102 movement, the media device 104 may be configured to automatically scroll form the first portion of the rendered image 508 to the second portion of the rendered image 512. By automatically scrolling during the user 102 movement, the user 102 may not notice a change in the position of the displayed content 110 relative to the user's 102 position, and may continue to consume the displayed content 110.

In the third user position 514, the user 102 moves downward relative to the user 102 depicted in the second user position 510. The media device 104 generates and displays a third portion of the rendered image 516 at the display window 208 of the media device 104. The third portion of the rendered image 516 may be generated based on the predictive data 136. The third portion of the rendered image 516 is a list of fruits and vegetables which includes the following: "Banana, Carrot, Celery, Cherry, Grape, Lemon, and Lime." The focal point 410 illustrates that the user 102 is still focused at the particular point of the list, just before the word "Lemon".

By displaying the different portions of the rendered image 508, 512 and 516 as the user 102 moves upward and downward relative to the media device 104, the media device 104 may enable the user 102 to continue to consume the content 110.

Figure 6:
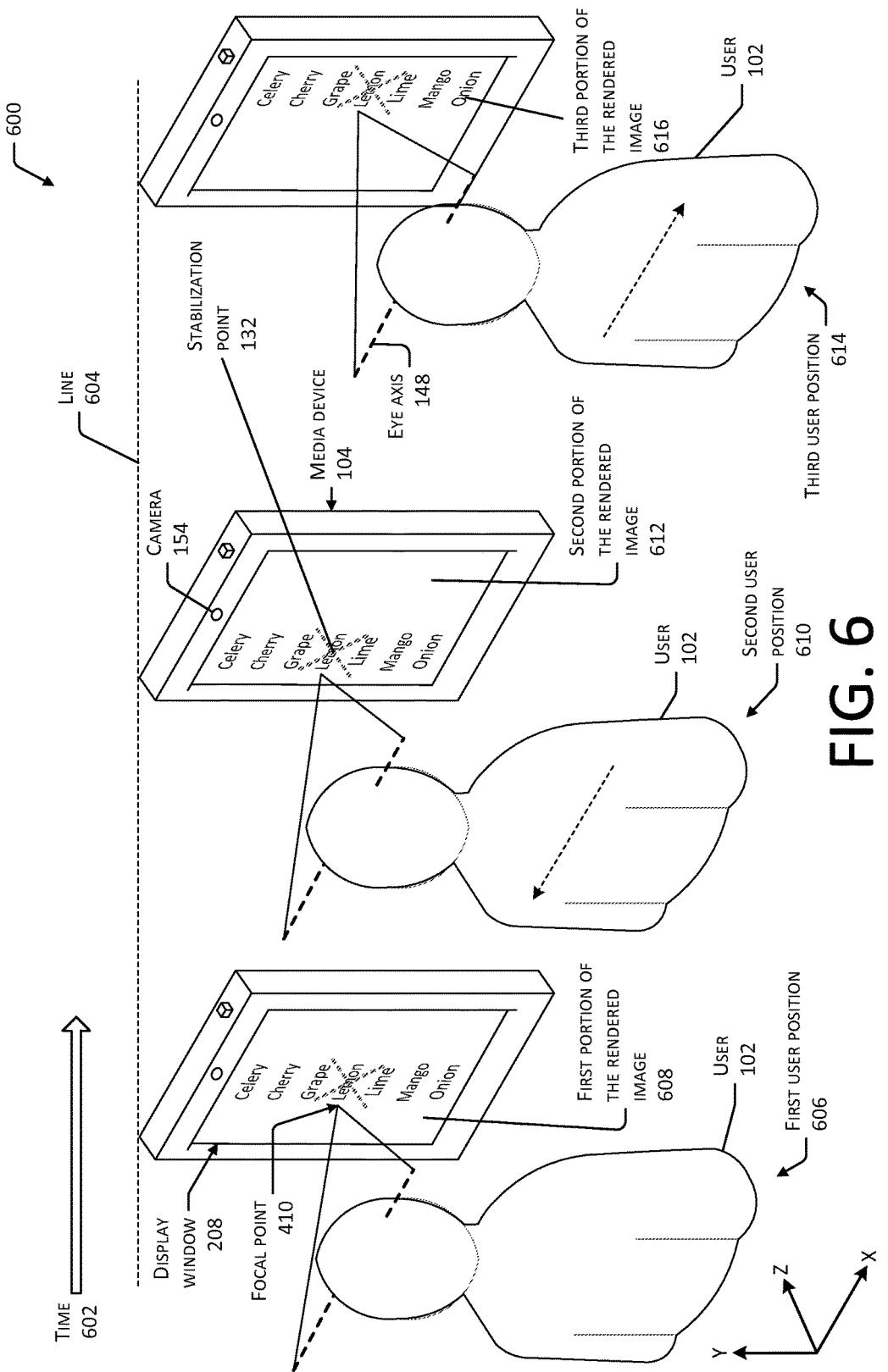
FIG. 6 is a schematic of the media device, illustrating different portions of the rendered image being displayed based on the user moving in a transverse direction relative to the media device.

FIG. 6 is a schematic 600 of the media device 104, illustrating different portions of the rendered image 118 being displayed based on the user 102 moving in a transverse direction relative to the media device 104. For example, the user 102 depicted in FIG. 6 may be visualized as riding on a train that bounces which causes the relative distance between the user 102 and the media device 104 to oscillate. In this illustration, time increases across the page, as indicated by the arrow 602. Line 604 is an arbitrary line depicted to illustrate that the media device 104 remains fixed.

In a first user position 606, the media device 104 generates and displays a first portion of the rendered image 608 at the display window 208 of the media device 104. The first portion of the rendered image 608 may be displayed based on the user 102 operating the media device 104 and selecting the first portion of the rendered image 608 to be displayed. In the first user position 606, the user 102 is reading a portion of the list of fruits and vegetables. The first portion of the rendered image 608 is a list of fruits and vegetables which includes the following: "Celery, Cherry, Grape, Lemon, Lime, Mango, and Onion." The focal point 410 illustrates that the user 102 is focused at a particular point of the list, just before the word "Lemon".

In a second user position 610, the user 102 moves to the left relative to the user 102 depicted in the first user position 606. The stabilization point 132 may be generated based on the movement of the user 102. The media device 104 generates and displays a second portion of the rendered image 612 at the display window 208 of the media device 104. The second portion of the rendered image 612 may be generated based on the predictive data 136. The predictive data 136 may be generated using the stabilization point 132 and the movement data 126 which may be generated from the user 102 movement. The second portion of the rendered image 612 is a list of fruits and vegetables which includes the following: "Celery, Cherry, Grape, Lemon, Lime, Mango, and Onion." The focal point 410 illustrates that the user 102 is still focused at the particular point of the list, just before the word "Lemon".

In a third user position 614, the user 102 moves to the right relative to the user 102 depicted in the second user position 610. The media device 104 generates and displays a third portion of the rendered image 616 at the display window 208 of the media device 104. The third portion of the rendered image 616 may be generated based on the predictive data 136. The third portion of the rendered image 616 is a list of fruits and vegetables which includes the following: "Celery, Cherry, Grape, Lemon, Lime, Mango, and Onion." The focal point 410 illustrates that the user 102 is still focused at the particular point of the list, just before the word "Lemon".

By displaying the different portions of the rendered image 608, 612 and 616 as the user 102 moves from left to right relative to the media device 104, the media device 104 may enable the user 102 to continue to consume the content 110.

Figure 7:
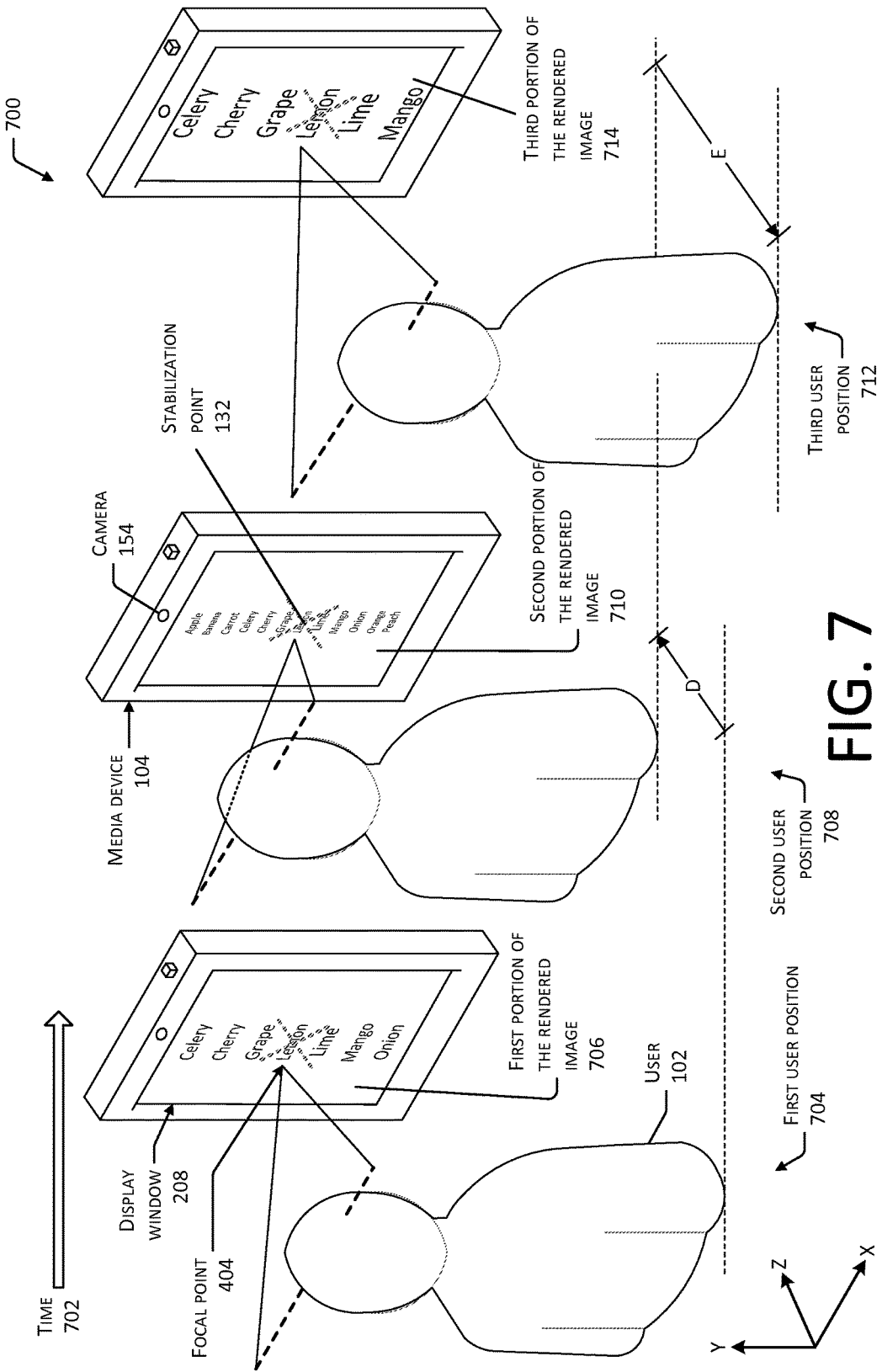
FIG. 7 is a schematic of the media device, illustrating different portions of the rendered image being displayed based on the user moving closer to and further from the media device.

FIG. 7 is a schematic 700 of the media device 104, illustrating different portions of the rendered image 118 being displayed based on the user 102 moving closer to and further from the media device 104. In this illustration, time increases across the page, as indicated by the arrow 702.

In a first user position 704, the media device 104 generates and displays a first portion of the rendered image 706 at the display window 208 of the media device 104. The first portion of the rendered image 706 may be displayed based on the user 102 operating the media device 104 and selecting the first portion of the rendered image 706 to be displayed. In the first user position 704, the user 102 is reading a portion of the rendered image 706 which includes a list of fruits and vegetables. The list of fruits and vegetables which includes the following: "Celery, Cherry, Grape, Lemon, Lime, Mango, Onion". The focal point 410 illustrates that the user 102 is focused at a particular point of the list, just before the word "Lemon".

In a second user position 708, the user 102 moves closer to the media device 104 by a distance of D. The stabilization point 132 may be generated based on the movement of the user 102. The media device 104 generates and displays a second portion of the rendered image 710 at the display window 208 of the media device 104. The second portion of the rendered image 710 may be generated based on the predictive data 136. The predictive data 136 may be generated using the stabilization point 118 and the movement data 126 which may be generated from the user 102 movement. The second portion of the rendered image 710 includes a list of fruits and vegetables which include the following: "Apple, Banana, Carrot, Celery, Cherry, Grape, Lemon, Lime, Mango, Onion, Orange, and Peach." The focal point 410 illustrates that the user 102 is still focused at the particular point of the list, just before the word "Lemon". In this example, during the user 102 movement, the media device 104 may be configured to cause the displayed content 110 to appear to remain in a fixed position relative to Earth. By causing the displayed content 110 to appear to remain in the fixed position relative to Earth, the changes in the relative distance between the user 102 and the media device 104 during movement may not affect the user's ability to consume the displayed content.

In a third user position 712, the user 102 moves further from the media device 104 by a distance of E. The media device 104 generates and displays a third portion of the rendered image 714 at the display window 208 of the media device 104. The third portion of the rendered image 714 includes a list of fruits and vegetables which includes the following: "Celery, Cherry, Grape, Lemon, Lime, and Mango." The focal point 410 illustrates that the user 102 is still focused at the particular point of the list, just before the word "Lemon".

The third portion of the rendered image 714 may be generated based on the predictive data 136. The third portion of the rendered image 714 may be generated by zooming into the second portion of the rendered image 710. Zooming into an image may include various steps. For example, zooming may comprise increasing or decreasing the size of a particular rendered image 118. The media device 104 may zoom using interpolation which may include constructing one or more new data points within a range of a discrete set of known data points. The media device 104 may zoom into the second portion of the rendered image 710 to generate the third portion of the rendered image 714 using a smooth zoom function.

By displaying the different portions of the rendered image 706, 710 and 714 as the user 102 moves closer and further from the media device 104, the media device 104 may enable the user 102 to continue to consume the content 110.

Figure 8:
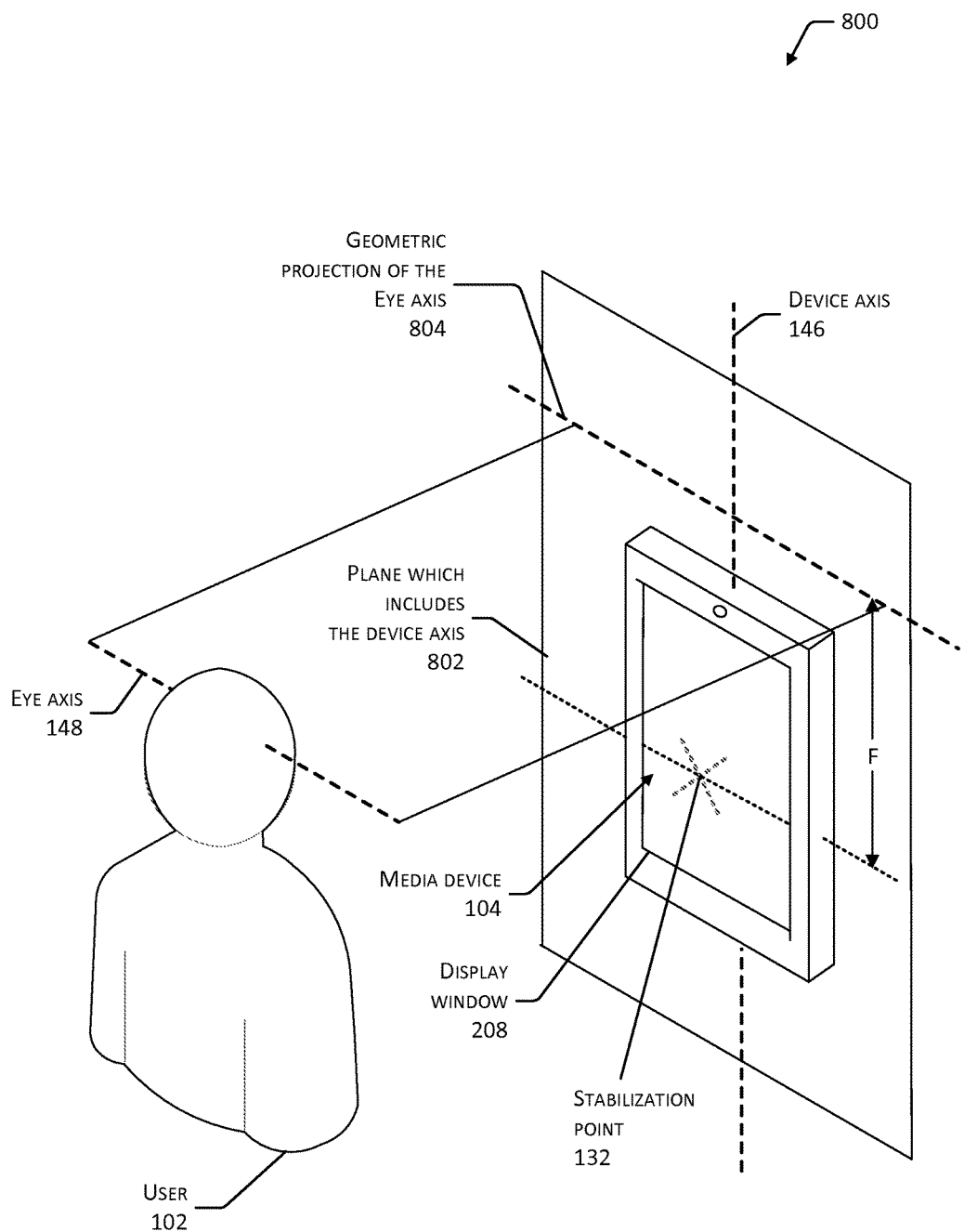
FIG. 8 is a schematic of a plane of the media device which includes the device axis and a geometric projection of the eye axis.

FIG. 8 is a schematic of a plane 802 of the media device 104 which includes the device axis 146 and a geometric projection of the eye axis 804. The media device 104 may generate one or more portions of the rendered image 118 based on the distance of F between the stabilization point 132 and the geometric projection of the eye axis 804 onto the plane 802 of the media device 104. In this example, the plane 802 is a flat, two-dimensional surface which extends along the longest edge of the media device 104 (such as height), and along the second longest edge of the media device 104 (such as width).

Figure 9:
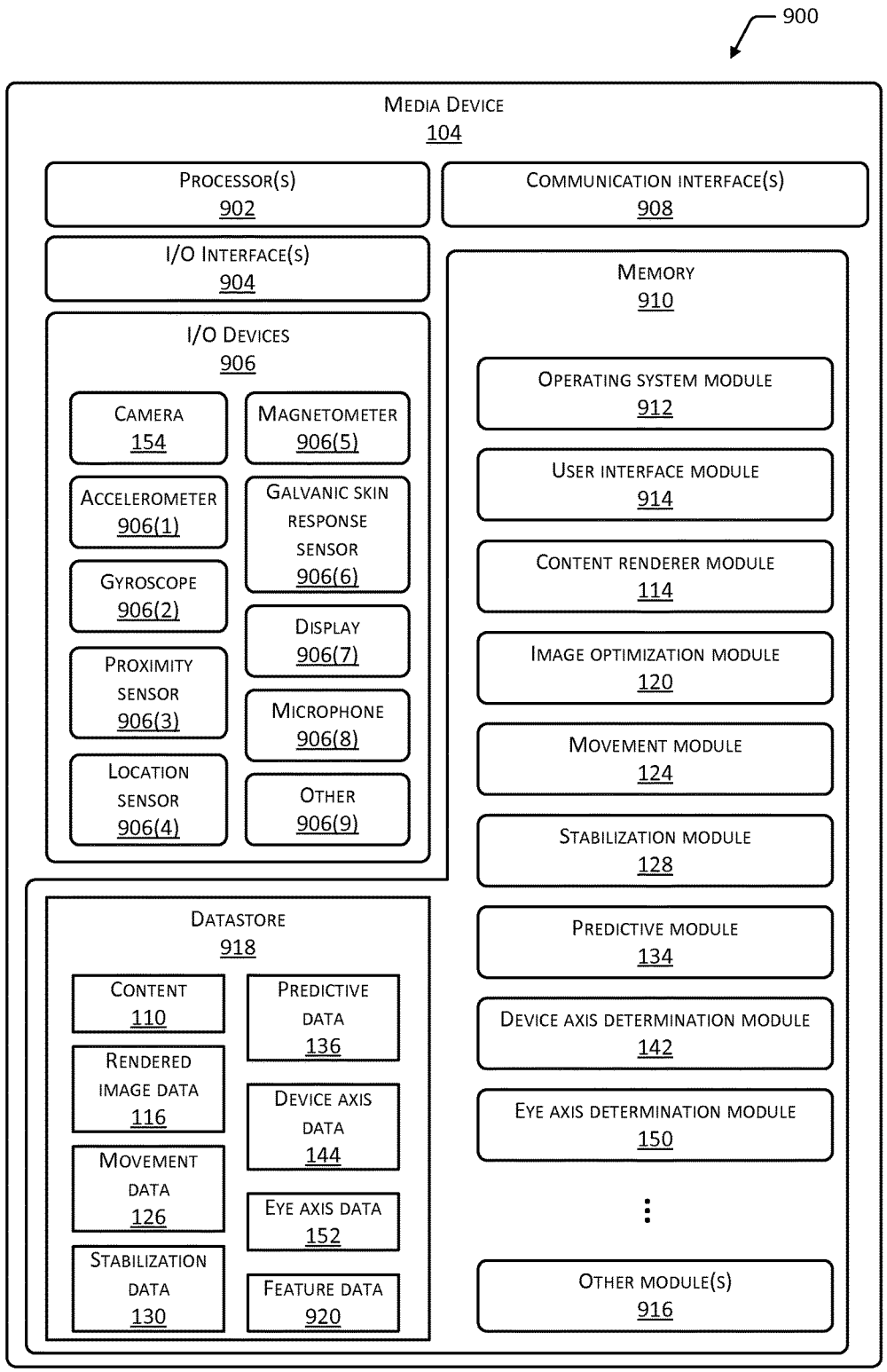
FIG. 9 is a block diagram of the media device configured to present the content based the predictive data.

FIG. 9 is a block diagram 900 of the media device 104 configured to present the content 110 based the predictive data 136. The media device 104 may include at least one processor 902 configured to execute stored instructions. The at least one processor 902 may comprise one or more cores.

The media device 104 includes at least one input/output ("I/O") interface 904 which enables portions of the media device 104 (e.g., the processor 902) to communicate with other devices. The I/O interface 904 may include inter-integrated circuit ("I2C"), serial peripheral interface bus ("SPI"), Universal Serial Bus ("USB"), RS-232, HDMI, TOSLINK, Bluetooth, and so forth. The at least one I/O interface 904 may be coupled to at least one I/O device 906. In some implementations, certain I/O devices 906 are physically incorporated with the media device 104 or externally placed.

As illustrated in FIG. 9, the at least one I/O device 906 may include the camera 154, an accelerometer 906(1), a gyroscope 906(2), a proximity sensor 906(3), a location sensor 906(4), a magnetometer 906(5), a galvanic skin response sensor 906(6), a display 906(7), microphone 906 (8) and other I/O devices 906(9).

The camera 154 may be configured to acquire image data (e.g., photographs), video data, or a combination thereof. The camera 154 may include any device configured to acquire image data.

At least one of the accelerometer 906(1) or the gyroscope 906(2) may be configured to generate the movement data 126 representing movement of the media device 104. In some implementations, the user 102 may wear the accelerometer 906(1). In these implementations, the accelerometer 906(1) may be configured to generate data representing movement of the user 102 associated with the media device 104. The accelerometer 906(1) may be configured to be worn by the user 102 as an earpiece.

The proximity sensor 906(3) may be configured to generate data indicative of a presence of an object proximate to the media device 104. For example, the proximity sensors 906(3) may detect a table, the user's 102 hand, and so forth. The proximity sensors 906(3) may include optical proximity sensors, capacitive proximity sensors, acoustic proximity sensors, near field communication ("NFC") tag readers, radio frequency identification ("RFID") tag readers, and so forth.

The location sensor 906(4) may be configured to generate location data. The location data may include geolocation data which is indicative of a latitude and longitude of the media device 104. The location sensor 906(4) may also determine the location of the media device 104 using an inertial navigation system, dead-reckoning navigation system, network positioning system, radio position finding system, satellite-based navigation system, an accelerometer system, a gyroscope system, and so forth. The satellite-based system may include one or more of a Global Positioning System receiver, a GLONASS receiver, a Galileo receiver, an Indian Regional Navigational Satellite System, and so forth. The media device 104 may use the microphone 906(8) to acquire audio data about the surrounding environment of the media device 104. Using the audio data, the media device 104 may generate the location data. For example, the microphone 906(8) may acquire data which is associated with audio sounds of an airplane. Based on the acquired data, the media device 104 may determine that the media device 104 is located on an airplane.

The magnetometer 906(5) may be configured to measure the strength and the direction of magnetic fields. In some implementations, the media device 104 uses the magnetometer 906(5) as a compass which indicates direction in a frame of reference that is stationary to the surface of Earth.

The galvanic skin response sensor 906(6) may be configured to measure the electrical conductance of the user's skin. The electrical conductance of the user's 102 skin may vary based on the user's 102 skin's moisture.

The display 906(7) may include an electrophoretic display, a liquid crystal display, an interferometric display, a cholesteric display, a light emitting diode display, a projection display, and so forth. The display 906(7) includes a display screen where the content 110 is displayed. The other I/O devices 906(9) may include other components such as one or more buttons, one or move touch sensors and one or more haptic output devices. The other I/O devices 906(9) may include a 3D sensor (not shown) which is configured to acquire data about a real-world object or environment which may include data about its shape and appearance (e.g., color). The media device 104 may generate digital, three dimensional models using the acquired data.

The media device 104 may include at least one communication interface 908. The communication interface 908 may be configured to provide communications between the media device 104 and other devices, such as servers, routers, access points and so forth. The communication interface 908 may connect to a network.

The media device 104 may include at least one bus or other internal communications hardware or software that enables for the transfer of data between the various modules and components of the media device 104.

As illustrated in FIG. 9, the media device 104 may include at least one memory or memory device 910. The memory 910 may include at least one computer-readable storage media ("CRSM"). The CRSM may include at least one of an electronic storage medium, a magnetic storage medium, an optical storage medium, a quantum storage medium, a mechanical computer storage medium, and so forth. The memory 910 may include computer readable instructions, data structures, program modules and other data for the operation of the media device 104.

The memory 910 may include at least one operating system ("OS") module 912. The OS module 912 may be configured to manage hardware resources such the I/O interface 904, the I/O device 906, the communication interface 908, and provide various services to applications or modules executing on the processor 902. The memory 910 may also store at least one of the following modules which may be executed as foreground applications, background tasks, daemons, and so forth. Other computing devices, such as a proxy server, may execute one or more of the following modules.

The memory 910 may include a user interface module 914 configured to provide a user interface to the user 102 using the I/O devices 906 and to accept inputs received from the I/O devices 906. The user interface may include one or more visual, audible, or haptic elements. For example, the user interface may be configured to provide a graphic user interface, an audible user interface, and so forth.

The content renderer module 114 may generate the rendered image data 116. In some implementations, the content renderer module 114 generates the rendered image data 116 using the content 110.

The image optimization module 120 is configured to present the content 110 using output devices such as the display 906(7). The image optimization module 120 may generate at least one of the rendered image 118 or the one or more portions of the rendered image. In some implementations, the image optimization module 120 generates the one or more portions of the rendered image 118 using the predictive data 136.

The movement module 124 may be configured to generate the movement data 126. The movement data 126 may be generated using at least one of the accelerometer 906(1), the gyroscope 906(2), or the proximity sensor 906(3).

The stabilization module 128 may generate the stabilization data 130. In some implementations, the stabilization module 128 generates the stabilization data 130 in response to the movement value of the movement data 126 being greater than or equal to a threshold value. The stabilization data 130 may represent a stabilization point 132. The stabilization point 132 may represent a reference relative to Earth.

The predictive module 134 may generate the predictive data 136. In one implementation, the predictive module 134 generates the predictive data 136 using the movement data 126 and the stabilization data 130. The predictive data 136 may represent one or more positions of the media device 104 relative to the stabilization point 132.

The device axis determination module 142 may be configured to generate the device axis data 144 representative of the device axis 146. The device axis data 144 may be generated using the accelerometer 906(1), the gyroscope 906(2), or a combination thereof. The accelerometer 906(1) and gyroscope 906(2) may be used to determine the orientation of the media device 104.

The eye axis determination module 150 may be configured to generate the eye axis data 152 representative of the eye axis 148. To generate the eye axis data 148, the eye axis determination module 150 may use the camera 154 to acquire feature data. The feature data is discussed in more detail below. The determination of the eye axis data 152 may be based on data representative of the user's 102 eyes. In some implementations, the determination of the eye axis data 152 may be based on other features of the user 102, for example, the user's 102 mouth, ears, nose, shoulders of the user 102, a hat worn by the user 102, facial hair of the user 102, jewelry worn by the user 102, or glasses worn by the user 102, and so forth.

As illustrated in FIG. 9, the media device 104 may include other module(s) 916. For example, the other module 916 may include a location determination module (not shown) configured to provide the location data of the media device 104 based at least in part on information received from the one or more location sensors 906(4). The location data may include data indicative of the location of the media device 104. The location data may include geolocation data which is indicative of the latitude and longitude of the media device 104, relative position such as "conference hall A", and so forth. In some implementations, the predictive data 136 may be determined or adjusted based on the location data. For example, when the location data indicates the user 102 is on a particular train, the media device 104 may generate the predictive data 136 based on historical data associated with particular train which may indicate certain known oscillations of the particular train.

In some implementations, the memory 910 includes a datastore 918 for storing information. The datastore 918 may use a flat file, database, linked list, tree or other data structure to store the information. The datastore 918, or a portion thereof, may be distributed across at least one other device, such as a server, a network storage device, and so forth. As illustrated in FIG. 9, the datastore 918 may include the content 110, the rendered image data 116, the movement data 126, the stabilization data 130, the predictive data 136, the device axis data 144, the eye axis data 152, feature data 920 and other data (not shown).

The content 110 may include audio data, video data, electronic book data, application data, game data, and so forth. The content 110 disclosed herein may be stored in its entirety or a portion. For example, the media device 104 may stream content 110 from a server, such that, at any given time, only a portion of the content 110 is stored within the memory 910.

The rendered image data 116 may represent the rendered image 118, which represents a particular image of the content 110 which the user 102 may consume. For example, the rendered image 118 may represent a page in a book, a webpage, a photo, and so forth. In another example, when the user 102 is viewing a movie, the rendered image 118 may represent a particular frame of the movie.

The movement data 126 may include data representative of a device movement of the media device 104 or a user movement of a user 102 associated with the media device 104. The stabilization data 130 may represent the stabilization point 132. The stabilization point 132 may represent a reference relative to Earth or some other reference which is considered fixed.

The predictive data 136 may represent one or more positions of the media device 104, or a component thereof (e.g., the display window 208) relative to the stabilization point 132. In some implementations, the predictive data 136 may represent one or more portions of the rendered image 118.

The device axis data 144 may be representative of the device axis 146 which may be described as being parallel with the longest dimension of the media device 104. The eye axis data 152 may be representative of a line which extends between or through each of the user's 102 pupils.

The eye axis data 152 may represents the eye axis 148 of the user 102. The eye axis 148 may be described as a straight line which extends through each of the user's 102 eyes.

The feature data 920 may include data representative of the user's 102 features, for example, the user's 102 eyes, mouth, ears, nose, shoulders of the user, a hat worn by the user, facial hair of the user, jewelry worn by the user, or glasses worn by the user, and so forth. The feature data 920 may include first eye data representative of the user's 102 first eye, and second eye data representative the user's 102 second eye.

Figure 10:
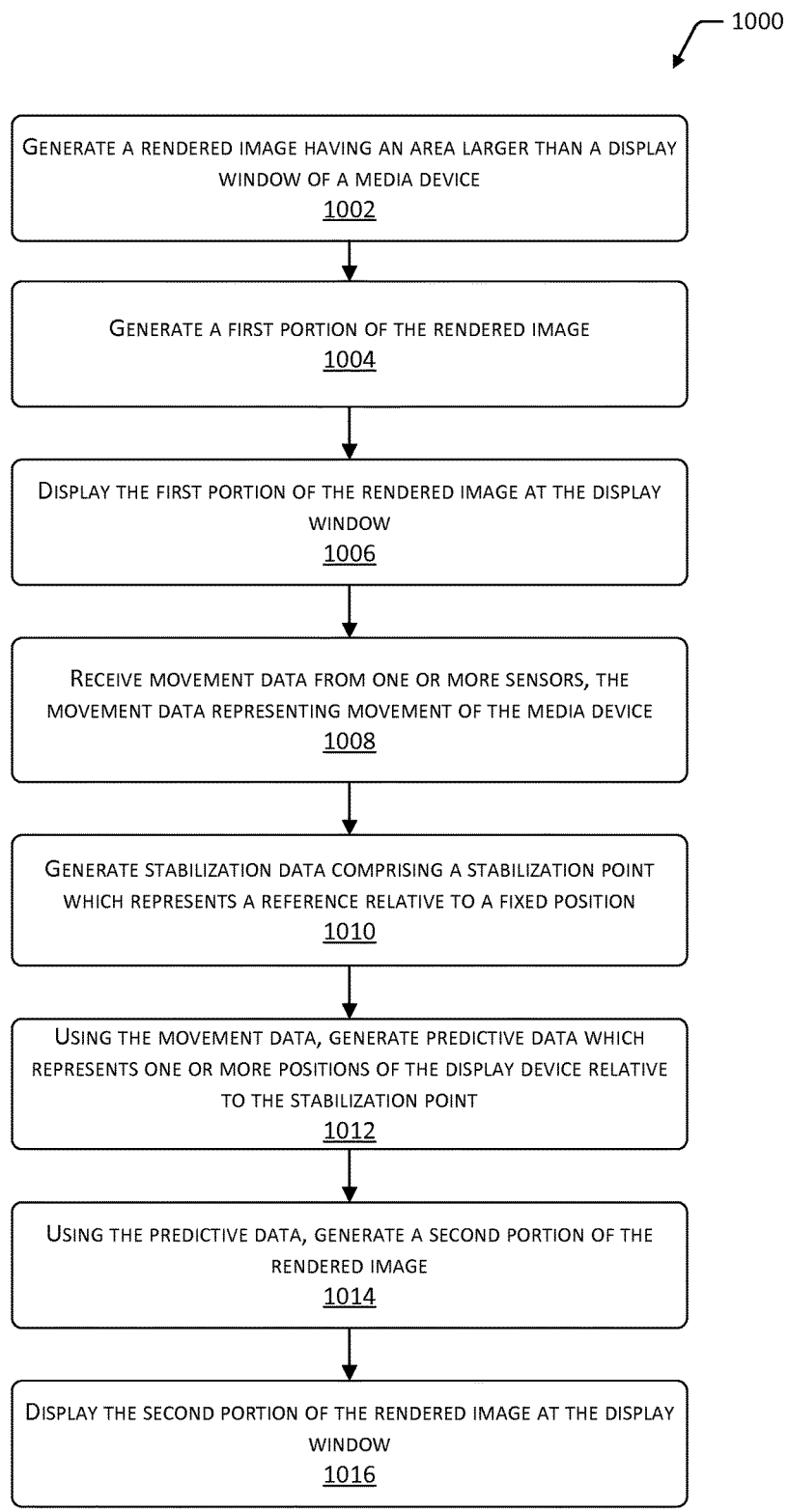
FIG. 10 is a flowchart illustrating a process of generating the predictive data using the movement data and the stabilization point.

FIG. 10 is a flowchart illustrating a process 1000 of generating the predictive data 136 using the movement data 126 and the stabilization point 132. The media device 104 may implement the process 1000. Although the process 1000 is described with reference to the flowchart illustrated in FIG. 10, many other methods performing the acts associated with the process 1000 may be used. For example, the order of the steps may be changed, some of the steps described may be optional, and additional steps may be included.

At block 1002, the media device 104 generates the rendered image 118 having an area larger than the display window 208 of the media device 104. The rendered image 118 may comprise a digital image generated from the content 110. The rendered image may have a virtual length and a virtual width. The display window 208 may have a physical length and a physical width. The virtual length of the rendered image 118 may be larger than the physical length of the display window 208, the virtual width of the rendered image 118 may be larger than the physical width of the display window 208, or both the virtual length and virtual width of the rendered image 118 may be larger than the physical length and the physical width of the display window 208. The virtual length and virtual width may be measured based on pixels. For example, the virtual length may be a first number of pixels, and the virtual width may be a second number of pixels.

At block 1004, the media device 104 generates the first portion of the rendered image 122. The media device 104 may generate the first portion of the rendered image 122 based on a user 102 selection.

At block 1006, the media device 104 displays the first portion of the rendered image 122 at the display window 208. The media device 104 may display the first portion of the rendered image 122 using the display 906(7).

At block 1008, the media device 104 receives the movement data 126 from one or more sensors. The one or more sensors may be configured to transmit the movement data 126 to the processor 902 of the media device 104 in response to the movement value of the displaced movement of the media device 104 being equal to or greater than a threshold number. For example, the movement value may be measured in g-force. The one or more sensors may be configured to transmit the movement data 126 to the processor 902 of the media device 104 in response to the g-force being equal to or greater than a threshold measurement. In some implementations, the movement data 126 represents oscillations of the position of the media device 104 relative to Earth.

At block 1010, the media device 104 generates the stabilization point 132 which comprises a reference relative to a fixed position. The fixed position may include a fixed spatial position relative to Earth. In one implementation, the media device 104 may generate offset data based on the distances and angles between the movement data and a fixed reference point.

At block 1012, using the movement data 126 and the stabilization point 132, the media device 104 generates the predictive data 136 which represents one or positions of the media device 104 relative to the stabilization point 132. For example, using the offset data generated above, predicative data representing predictions of future movements may be generated. In some implementations, the media device 104 generates the predictive data 136 in response to the movement value being at least equal to or greater than the threshold value. The media device 104 may generate the predictive data 136 based on the location data which may represent a latitude and longitude of the media device 104.

For example, the location data may indicate that the media device 104 is travelling on a particular bus which is associated with known jostles caused by a particular path travelled by the particular bus. Using these known jostles, the media device 104 may generate the predictive data 136.

At block 1014, using the predictive data 136, the media device 104 generates the second portion of the rendered image 138. The media device 104 may generate the second portion of the rendered image 138 by zooming into the first portion of the rendered image 122. At block 1016, the media device 104 displays the second portion of the rendered image 138 at the display window 208. In some implementations, the media device 104 is configured to scroll from the first portion of the rendered image 122 to the second portion of the rendered image 138.

In some implementations, the media device 104 generates offset data which may comprise data about distances and angles based on the movement data 126 and the stabilization point 132. Once the offset data is generated, the media device 104 may generate the predictive data 136 which may represent predictions of future movement.

Figure 11:
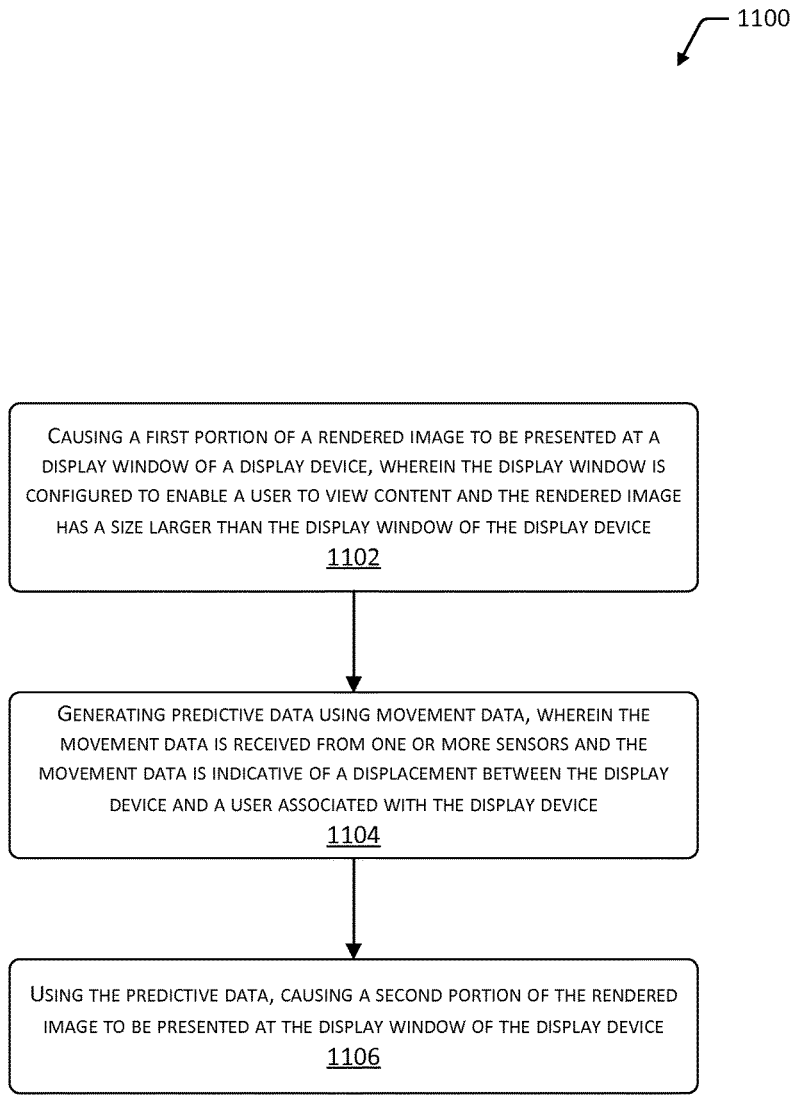
FIG. 11 is a flowchart illustrating a process of causing a second portion of the rendered image to be presented at a display window of a display device.

FIG. 11 is a flowchart illustrating a process 1100 of causing a second portion of the rendered image to be presented at the display window 208 of the display device 906(7). At least one of the media device 104 or another computing device (e.g., a proxy server, edge server, and so forth) may implement the process 1100. Although the process 1100 is described with reference to the flowchart illustrated in FIG. 11, many other methods performing the acts associated with the process 1100 may be used. For example, the order of the steps may be changed, some of the steps described may be optional, and additional steps may be included.

The proxy server may be located at various locations. For example, the proxy server may be located on a plane, a train, a bus, and so forth.

At block 1102, at least one of the media device 102 or the another computing device may cause the first portion of the rendered image 122 to be presented at the display window 208 of the display device 906(7), wherein the display window 208 is configured to enable the user 102 to view the content 110 and the rendered image 118 has a size larger than the display window 208 of the display device 906(7).

At block 1104, at least one of the media device 104 or the another computing device may generate the predictive data 136 using the movement data 126. The movement data 126 may be based on data received from one or more sensors. The movement data 126 is indicative of a displacement between the display device 906(7) and the user 102 associated with the display device 906(7). The one or more sensors may be configured to be worn by the user 102 of the media device 104, integrated into a vehicle in use by the user 102, and so forth. For example, the movement data 126 may be provided by a ring or a watch worn by the user 102 which contains one or more accelerometers. In some implementations the movement data 126 may be based on historical data, such as information about data acquired along the same route, on the same or similar vehicles, and so forth. For example, the movement data 126 may include information about accelerations caused by a bus driving across potholes in known locations.

In some implementations, the one or more sensors may provide the movement data 126 to the proxy server or other computing device discussed above. The one or more sensors may be on objects, such as a bus, a car, a plane, a treadmill, and so forth. In some implementations, the one or more sensors may be located on a road. For example, the one or more sensors may be located on a camera used by the Department of Transportation. In one example, when the user 102 boards a bus, the proxy server discussed above may establish a connection with the bus, such that the proxy server may receive the movement data 126 from the one or more sensors directly from the bus. Thereafter, the proxy server may use data from the one or more sensors to perform other processes such as generating the predictive data 136. In one example, the proxy server may establish the connection with the one or more sensors in response to the user 102 using an NFC tag reader when boarding the bus. In another example, the proxy server may establish the connection with the object based on the location data discussed above. For example, the location data may indicate that the user 102 is on a particular bus. Once the user 102 boards the particular bus, the proxy server may establish the connection.

In some implementations, the movement data 126 is generated based on a model of the user 102. This model may be based at least in part on calibration data. In one example, the proxy server may receive the movement data 126 from one or more sensors located on a bus in response to the bus traversing a pothole. Thereafter, using the movement data 126, the proxy server may perform one or more processes using various information, such as information about the weight of the media device 104, and information about how the media device 104 moved previously when the user 102 was holding the media device 104 in two hands and the bus hit a different bump. The proxy server may provide an updated rendered image 118 to the media device 104, motion vector information, and so forth.

At block 1106, using the predictive data 136, at least one of the media device 104 or the another computing device may cause the second portion of the rendered image 138 to be presented at the display window 208 of the display device 906(7). In some implementations, the second portion of the rendered image 138 may be presented at the display window 208 based on crowd-sourced information. For example, a plurality of media devices 104 on the same bus may provide movement data 126 or other information. The movement data 126 may be averaged or adjusted based on various portions of bus (e.g., the front portion, the middle portion, or the back portion). Communication may be routed through the bus, the user's 102 media device 104, or other devices on the bus. In some implementations, the plurality of media devices 104 may communicate via inter-device communication (e.g., NFC, Bluetooth®, Zoosh™, Wi-Fi™, and so forth).

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a nontransitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A media device comprising:
   a processor;
   a display device in operative communication with the processor, the display device including a display window which enables a user to view content;
   one or more sensors in operative communication with the processor, the one or more sensors including at least one of an accelerometer or a gyroscope; and
   a memory in operative communication with the processor, the memory storing instructions, which when executed by the processor, cause the processor, in cooperation with the display device, the one or more sensors and the memory device, to:
      access the content from the memory of the media device;
      generate a rendered image from the content, wherein the rendered image has an area larger than the display window;
      generate a first portion of the rendered image;
      display the first portion of the rendered image in the display window of the media device;
      receive movement data of the media device from the one or more sensors, the movement data including an offset caused by a movement of the media device relative to a fixed spatial orientation relative to Earth;
      generate stabilization data representing a stabilization point associated with a fixed position in the first portion of the rendered image associated with a focal point in the rendered image along an axis projecting from eyes of the user;
      using the movement data and the stabilization point, generate predictive data representing one or more change in positions of the media device relative to the stabilization point;
      using the predictive data, generate a second portion of the rendered image such that a relative position of the stabilization point to the focal point in the rendered image along the axis projecting from the eyes of the user remains the same during the movement of the media device relative to the fixed spatial orientation; and
      display the second portion of the rendered image in the display window of the media device, wherein the second portion of the rendered image is stabilized with respect to a change in relative position between the media device and the fixed spatial orientation to maintain the relative position of the stabilization point to the focal point in the rendered image along the axis projecting from the eyes of the user.

2. The media device of claim 1, wherein:
   a display area of the display window has a physical length and a physical width; and
   the rendered image has a virtual length of a first number of pixels and a virtual width of second number of pixels, wherein at least one of:
      the virtual length is larger than the physical length of the display area; or
      the virtual width is larger than the physical width of the display area.

3. The media device of claim 1, wherein:
   the movement data represents oscillations of the position of the media device relative to the fixed spatial orientation; and
   the predictive data is generated using the oscillations of the media device.

4. A method comprising:
   causing a first portion of a rendered image originating on a display device to be presented at a display window of the display device, wherein the display window is configured to enable a user to view content and the rendered image has a size larger than the display window of the display device;
   generating a stabilization point associated with a fixed position in the first portion of the rendered image, the stabilization point representing the fixed position in the first portion of the rendered image associated with a focal point in the rendered image along an axis projecting from eyes of the user;
   generating predictive data using movement data and the stabilization point, wherein the movement data is received from one or more sensors and the movement data includes an offset indicative of a relative movement of a position of the display device to a fixed spatial orientation relative to Earth; and
   using the predictive data to cause a second portion of the rendered image to be presented at the display window of the display device such that the relative position of the stabilization point and the focal point in the rendered image along the axis projecting from the eyes of the user remains the same, wherein the second portion of the rendered image is stabilized to maintain the relative position of the stabilization point in the second portion of the rendered image to the focal point in the rendered image along the axis projecting from the eyes of the user during the movement of the media device relative to the fixed spatial orientation.

5. The method of claim 4, wherein the predictive data represents at least one of one or more change in positions of the display device relative to the fixed spatial orientation.

6. The method of claim 4, further comprising determining a movement value indicative of movement associated with the relative movement of the position of the display device relative to the fixed spatial orientation, wherein the generation of the predictive data occurs in response to the movement value being at least equal to or greater than a threshold value.

7. The method of claim 4, further comprising scrolling from the first portion of the rendered image to the second portion of the rendered image.

8. The method of claim 4, further comprising generating location data, the location data representing a latitude and longitude of the display device, wherein the predictive data is generated using the location data.

9. The method of claim 8, wherein the location data is generated using at least one of a location sensor and a microphone, the microphone being configured to acquire audio data about an environment surrounding the display device.

10. The method of claim 4, wherein the one or more sensors includes at least one of: an accelerometer; a gyroscope; or a proximity sensor configured to generate data indicating a presence of an object proximate to the display device.

11. The method of claim 4, further comprising acquiring first movement data representing a first position of the display device at a first point in time and second movement data representing a second position of the display device at a second point in time, wherein the first movement data and the second movement data are generated by comparing the relative movement of a position of the display device to the fixed spatial orientation.

12. The method of claim 4, wherein the movement data is received from a device configured to be worn by the user.

13. The method of claim 4, further comprising generating the second portion of the rendered image by zooming into the first portion of the rendered image.

14. The method of claim 4, wherein:
the first portion of the rendered image includes electronic book data including text;
the movement data is generated in response to a vehicle travelling over a path which causes the display device to move relative to the fixed spatial orientation of the display device; and
displaying the second portion of the rendered image at the display window enables the user to consume the text while the display device moves relative to the fixed spatial orientation of the display device while maintaining the relative position between the stabilization point and the focal point in the rendered image along the axis projecting from the eyes of the user.

15. The method of claim 4, wherein:
the first portion of the rendered image includes electronic book data including text;
the movement data is generated in response to usage of exercise equipment causing the display device to move relative to the fixed spatial orientation of the display device and the the focal point in the rendered image along the axis projecting from the eyes of the user; and
displaying the second portion of the rendered image at the display window enables the user to consume the text while using the exercise equipment and the display device moving relative to the fixed spatial orientation of the display device while maintaining the relative position between the stabilization point and the focal point in the rendered image along the axis projecting from the eyes of the user.

16. The method of claim 4, the rendered image comprising one or more of video data, electronic book data, or application data.

17. A media device comprising:
a processor;
a display device in operative communication with the processor, the display device including a display window, the display window being configured to enable a user to view content;
one or more sensors in operative communication with the processor; and
a memory in operative communication with the processor, the memory storing instructions, which when executed by the processor, cause the processor, in cooperation with the display device, the one or more sensors and the memory device, to:
access the content from the memory of the media device;
generate a rendered image from the content, wherein the rendered image has an area larger than the display window;
display at least a first portion of the rendered image in the display window of the media device;
generate a stabilization point associated with a fixed position in the first portion of the rendered image and a focal point in the first portion of the rendered image along an axis projecting from eyes of the user;
receive movement data of the media device from the one or more sensors, the movement data including a positional offset caused by relative movement between the media device and a fixed spatial orientation relative to Earth;
based on the movement data and the stabilization point, generate predictive data representing one or more change in positions of the media device relative to the stabilization point; and
using the predictive data, cause the display device to display a second portion of the rendered image in the display window of the media device, wherein the second portion of the rendered image is stabilized to maintain a relative position of the stabilization point in the second portion of the rendered image to the focal point in the rendered image along the axis projecting from the eyes of the user during the movement of the media device relative to the fixed spatial orientation.

18. The media device of claim 17, wherein the second portion of the rendered image includes a portion of the first portion of the rendered image.

19. The media device of claim 17, wherein the movement data comprises location data representing a latitude and longitude of the display device, wherein the predictive data is generated using the location data.

20. The media device of claim 17, wherein the one or more sensors includes at least one of: an accelerometer; a gyroscope; or a proximity sensor configured to generate data indicating a presence of an object proximate to the display device.

* * * * *